US 11,620,831 B2

(12) United States Patent
Walls et al.

(10) Patent No.: US 11,620,831 B2
(45) Date of Patent: Apr. 4, 2023

(54) REGISTER SETS OF LOW-LEVEL FEATURES WITHOUT DATA ASSOCIATION

(71) Applicant: TOYOTA RESEARCH INSTITUTE, INC., Los Altos, CA (US)

(72) Inventors: Jeffrey Michael Walls, Ann Arbor, MI (US); Ryan W. Wolcott, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 120 days.

(21) Appl. No.: 16/862,546

(22) Filed: Apr. 29, 2020

(65) Prior Publication Data
US 2021/0342599 A1 Nov. 4, 2021

(51) Int. Cl.
| G06K 9/00 | (2022.01) |
| G06V 20/56 | (2022.01) |
| G06K 9/62 | (2022.01) |
| G01C 21/36 | (2006.01) |
| G01C 21/34 | (2006.01) |

(52) U.S. Cl.
CPC ......... *G06V 20/56* (2022.01); *G01C 21/3453* (2013.01); *G01C 21/3635* (2013.01); *G06K 9/6232* (2013.01); *G06K 9/6272* (2013.01)

(58) Field of Classification Search
None
See application file for complete search history.

(56) References Cited

U.S. PATENT DOCUMENTS

| 5,961,571 | A | * | 10/1999 | Gorr | G05D 1/0272 |
| | | | | | 340/988 |
| 6,560,354 | B1 | * | 5/2003 | Maurer, Jr. | G06T 7/33 |
| | | | | | 382/173 |
| 7,394,946 | B2 | * | 7/2008 | Dewaele | G06T 7/66 |
| | | | | | 382/128 |

(Continued)

FOREIGN PATENT DOCUMENTS

WO  2019099622  5/2019

OTHER PUBLICATIONS

Wyawahare et al., "Image registration techniques: an overview." International Journal of Signal Processing, Image Processing and Pattern Recognition 2, No. 3 (2009): 11-28. (Year: 2009).*

(Continued)

*Primary Examiner* — Feng Niu
(74) *Attorney, Agent, or Firm* — Sheppard, Mullin, Richter & Hampton LLP; Hector A. Agdeppa; Daniel N. Yannuzzi

(57) ABSTRACT

Systems and methods for localization of a subject vehicle may include: a plurality of sensors to gather data regarding features in an environment of the subject vehicle; a feature map module to generate a feature map using data gathered from one or more of the plurality of sensors; a feature raster module to generate a feature raster image from the feature map; a score computation module to register a plurality of transformations of the feature raster image with a map feature raster image, to generate a cost function for the registrations of the plurality of transformations, and to determine the transformation with the lowest cost function; and the score computation module using the transformation with the lowest cost function to determine localization of the subject vehicle.

19 Claims, 5 Drawing Sheets

(56) References Cited

U.S. PATENT DOCUMENTS

| | | | | |
|---|---|---|---|---|
| 7,415,133 | B2* | 8/2008 | Ikeda | G06V 20/588 701/28 |
| 8,335,352 | B2* | 12/2012 | Lee | G06V 20/588 382/104 |
| 8,473,187 | B2* | 6/2013 | Kammel | G01C 21/005 701/469 |
| 8,972,093 | B2* | 3/2015 | Joshi | B60W 30/12 701/23 |
| 9,298,992 | B2* | 3/2016 | Harada | G01C 21/30 |
| 9,727,793 | B2* | 8/2017 | Heisele | G01C 21/28 |
| 9,796,400 | B2* | 10/2017 | Puttagunta | B61L 25/04 |
| 9,818,190 | B2* | 11/2017 | Chukka | G06T 7/38 |
| 9,990,723 | B2* | 6/2018 | Van Leeuwen | G06T 7/0016 |
| 10,549,768 | B2* | 2/2020 | Puttagunta | B61L 23/041 |
| 10,769,840 | B2* | 9/2020 | Kulkarni | G06T 7/30 |
| 10,867,190 | B1* | 12/2020 | Vajna | G06V 20/64 |
| 10,885,605 | B2* | 1/2021 | Van Leeuwen | G06T 7/33 |
| 11,433,902 | B2* | 9/2022 | Murashkin | G01S 7/4802 |
| 2005/0259882 | A1* | 11/2005 | Dewaele | G06T 7/75 382/128 |
| 2006/0098897 | A1* | 5/2006 | Dewaele | G06T 7/32 382/294 |
| 2006/0133694 | A1* | 6/2006 | Dewaele | G06T 7/337 382/294 |
| 2007/0225913 | A1* | 9/2007 | Ikeda | G06T 7/60 382/104 |
| 2008/0027627 | A1* | 1/2008 | Ikeda | H04N 7/18 382/104 |
| 2008/0306384 | A1* | 12/2008 | Boctor | A61B 8/485 600/443 |
| 2010/0305854 | A1* | 12/2010 | Kammel | G01S 19/48 701/469 |
| 2012/0051649 | A1* | 3/2012 | Saund | G06V 30/18143 382/294 |
| 2014/0289418 | A1* | 9/2014 | Cohen | G06F 11/0709 709/226 |
| 2014/0303828 | A1* | 10/2014 | Joshi | B60W 30/16 701/23 |
| 2015/0233720 | A1* | 8/2015 | Harada | G01C 21/30 701/409 |
| 2016/0019695 | A1* | 1/2016 | Chukka | G06V 20/69 382/128 |
| 2016/0055196 | A1* | 2/2016 | Collins | G06F 16/23 707/690 |
| 2016/0221592 | A1* | 8/2016 | Puttagunta | B61L 25/025 |
| 2016/0267656 | A1* | 9/2016 | Van Leeuwen | G06T 7/0014 |
| 2017/0169300 | A1* | 6/2017 | Heisele | G06T 7/74 |
| 2018/0012400 | A1 | 1/2018 | Evans | |
| 2018/0057030 | A1* | 3/2018 | Puttagunta | B61L 27/04 |
| 2018/0211360 | A1* | 7/2018 | Van Leeuwen | G06T 7/33 |
| 2019/0050648 | A1* | 2/2019 | Stojanovic | G06V 20/13 |
| 2019/0147253 | A1* | 5/2019 | Bai | G06N 3/04 382/103 |
| 2019/0266779 | A1* | 8/2019 | Kulkarni | G06T 15/04 |
| 2019/0355152 | A1 | 11/2019 | Li | |
| 2020/0027225 | A1* | 1/2020 | Huang | G06T 7/73 |
| 2020/0109954 | A1* | 4/2020 | Li | G05D 1/0278 |
| 2020/0377105 | A1* | 12/2020 | Murashkin | G06V 10/80 |
| 2021/0063198 | A1* | 3/2021 | Nister | G06N 3/08 |
| 2021/0063199 | A1* | 3/2021 | Akbarzadeh | G01C 21/3841 |
| 2021/0063200 | A1* | 3/2021 | Kroepfl | G06N 3/02 |
| 2021/0287375 | A1* | 9/2021 | Meyers | G06T 7/174 |
| 2021/0403045 | A1* | 12/2021 | Lin | G01C 21/3691 |

OTHER PUBLICATIONS

Pulli, Kari. "Multiview registration for large data sets." In Second international conference on 3-d digital imaging and modeling (cat. No. pr00062), pp. 160-168. IEEE, 1999. (Year: 1999).*

Bhatia et al., "Consistent GroupWise Non-rigid Registration for Atlas Construction", IEEE international Symposium on Biomedical Imaging, vol. 1, Apr. 15-18, 2004, 908-911 (Year: 2004).*

Levoy et al., "The digital Michelangelo project: 3D scanning of large statues." In Proceedings of the 27th annual conference on Computer graphics and interactive techniques, pp. 131-144. 2000. (Year: 2000).*

Musick et al., "Track and bias estimation without data association", Proc. SPIE 4052, Signal Processing, Sensor Fusion, and Target Recognition IX, (Aug. 4, 2000); https://doi.org/10.1117/12.395091 (Year: 2000).*

Jende, P. et al., Low-Level Tie Feature Extraction of Mobile Mapping Data (MLS/Images) and Aerial Imagery, The International Archives of the Photogrammetry, Remote Sensing and Spatial Information Sciences, 2016 EuroCOW 2016, the European Calibration and Orientation Workshop, Feb. 10-12, 2016, pp. 19-26, vol. XL-3/W4, Lausanne, Switzerland.

Tong, G. et al., Point Set Multi-Level Aggregation Feature Extraction Based on Multi-Scale Max Pooling and LDA for Point Cloud Classification, Remote Sensing, Nov. 29, 2019, pp. 1-27, MDPI, Basel, Switzerland.

Olson, E. B., Real-Time Correlative Scan Matching, 2009 IEEE International Conference on Robotics and Automation, May 12-17, 2009, 7 pgs., IEEE, Kobe, Japan.

* cited by examiner

REGISTER SETS OF LOW-LEVEL FEATURES WITHOUT DATA ASSOCIATION

TECHNICAL FIELD

The present disclosure relates generally to rendering data alignment, and in particular, some implementations may relate to registering sets of low-level features.

DESCRIPTION OF RELATED ART

Autonomous vehicle technology is becoming more commonplace the introduction of each new model year of vehicles. While widespread adoption of fully autonomous vehicles is only now becoming visible on the horizon, autonomous vehicle technology is gaining increasing popularity for assisted driving and other semi-autonomous vehicle operation.

One challenge facing autonomous vehicles is how to determine with greater precision the exact location of a vehicle and a map or in the world. It is critical that accurate and precise localization of the vehicle be achieved in order to ensure safe and successful autonomous vehicle operation. While GPS-based position information, with meter-level accuracy, is typically sufficient to guide human operators along a route, its accuracy is insufficient to define the position and orientation of the vehicle to the extent necessary for safe autonomous vehicle operation.

Some conventional vehicles utilize a localization system as part of the autonomous vehicle stack. Typical localization systems use high density maps, such as point clouds captured using aerial lidar acquisition systems. Typical lidar systems use ultraviolet, visible or near-infrared light to measure distances to surrounding objects based on time-of-flight computations. This information can be used to generate a local map of the vicinity surrounding the vehicle. This local map can be used to register against a predetermined map to arrive at a refined position. These operations are often performed using high density map data and local map data, such as point clouds to perform the localization operations. Operations with high density data maps can be computationally expensive and time-consuming. They can also require storage of massive amounts of data. This increases the cost and decreases the practicality and desirability of the solutions. These operations also involve data association decisions to match up landmarks on the maps.

BRIEF SUMMARY OF THE DISCLOSURE

Various embodiments of the disclosed technology relate to the domain of scan matching to align point cloud data using a process that reduces computational complexity. Embodiments may be implemented to register sets of low-level features without data association and build a discrete representation of feature sets. Embodiments may be further implemented to compute the cost surface over all possible transformations of the representation. The low-level features in the system may relate to non-zero elements for 3D points, lines, planes etc. Also, the discrete representation of feature sets provided by the system can be in the form of a birds-eye view, binary rasters, binary grids etc.

Embodiments may also provide a 'consistency metric/cost' correlation and a cost surface computation over a set of transformations or over all possible transformations. In applications where low-level feature rasters are sparse (few nonzero elements), the system may be implemented to reduce complexity of computing a cost by only performing operations over the nonzero elements. This is because many cost scores boil down to convolutions.

In summary, and some embodiments the system detects features and lines using vehicle sensors and builds a feature raster, which may comprise a point, line or polygon converted to a raster data set. In some embodiments, low-level features are utilized. The system may also receive a feature map, such as a in the form of a set of features projected down to a birds eye view, and also generates a raster for the map data. The system then runs a registration algorithm to match and align the feature rasters across all transformations of the feature raster. The system determines the cost function for each transformation to determine which transformation has the lowest cost function.

A system for localization of a subject vehicle may include: a plurality of sensors to gather data regarding features in an environment of the subject vehicle; a feature map module to generate a feature map using data gathered from one or more of the plurality of sensors; a feature raster module to generate a feature raster image from the feature map; a score computation module to register a plurality of transformations of the feature raster image with a map feature raster image, to generate a cost function for the registrations of the plurality of transformations, and to determine the transformation with the lowest cost function; and the score computation module using the transformation with the lowest cost function to determine localization of the subject vehicle.

In some embodiments registering a plurality of transformations may include registering low level features without data association. In some embodiments the low level features relate to non-zero elements for at least one of 3D points, lines and planes. In some embodiments registration may be performed using only nonzero elements of the feature raster.

A system for vehicle localization using map data from multiple sources may include: a non-transitory memory configured to store instructions; at least one processor configured to execute the instructions to: determine a set of vehicle map data generated using vehicle sensors; project features of the vehicle map data into discretized feature representation; transform the discretized feature representation from a vehicle frame of reference to an external map frame of reference to generate a transformed discretized feature representation; register the transformed discretized feature representation with a map feature representation of a set of external map data and determine a cost function associated with the registration; repeat the registration for a plurality of transformations of the discretized feature representation and determine a cost function associated with each of the plurality of transformations; and use the transformation with the lowest cost function for vehicle localization.

In some embodiments projecting features of the map data into discretized feature representation may include creating a feature raster including a grid of pixels identifying features in the map data and transforming the discretized feature representation may include transforming the feature raster. In some embodiments the processor may be configured to further execute an instruction to determine a discrete map feature representation of a set of external map data received from a source external to the vehicle. In some embodiments registering the transformed discretized feature representation with a map feature representation of a set of external map data may include registering the transformed feature raster with a feature raster of the external map data.

In some embodiments registering the transformed discretized feature representation with a map feature representation of a set of external map data may include performing template matching.

A system for generating a cost surface for a discrete representation of three-dimensional (3D) point cloud data may include: a non-transitory memory configured to store instructions; at least one processor configured to execute the instructions to: determine one or more discrete representations of one or more images of the 3D point cloud data; determine normalized cross correlations between one or more feature points of the one or more images of the 3D point cloud data; generate one or more rigid body transforms corresponding to the one or more feature points based on the normalized cross correlations; and determine the cost surface for the one or more rigid body transformation based on elements of the one or more rigid body transformations.

A method for vehicle localization may include: determining a set of vehicle map data generated using vehicle sensors; projecting features of the vehicle map data into discretized feature representation; transforming the discretized feature representation from a vehicle frame of reference to an external map frame of reference to generate a transformed discretized feature representation; registering the transformed discretized feature representation with a map feature representation of a set of external map data and determine a cost function associated with the registration; repeating the registration for a plurality of transformations of the discretized feature representation and determine a cost function associated with each of the plurality of transformations; and using the transformation with the lowest cost function for vehicle localization.

In some embodiments projecting features of the map data into discretized feature representation may include creating a feature raster including a grid of pixels identifying features in the map data and transforming the discretized feature representation may include transforming the feature raster. The method may further include determining a discrete map feature representation of a set of external map data received from a source external to the vehicle.

In some embodiments registering the transformed discretized feature representation with a map feature representation of a set of external map data may include registering the transformed feature raster with a feature raster of the external map data.

In some embodiments registering the transformed discretized feature representation with a map feature representation of a set of external map data may include performing template matching.

A method of localization of a subject vehicle may include: receiving data regarding features in an environment of the subject vehicle; generating a feature map using data gathered from one or more of the plurality of sensors; generating a feature raster image from the feature map; registering a plurality of transformations of the feature raster image with a map feature raster image, to generate a cost function for the registrations of the plurality of transformations, and to determine the transformation with the lowest cost function; and using the transformation with the lowest cost function to determine localization of the subject vehicle.

In some embodiments registering a plurality of transformations may include registering low level features without data association. In some embodiments the low level features relate to non-zero elements for at least one of 3D points, lines and planes. In some embodiments registration may be performed using only nonzero elements of the feature raster.

A method for generating a cost surface for a discrete representation of three-dimensional (3D) point cloud data may include: determining one or more discrete representations of one or more images of the 3D point cloud data; determining normalized cross correlations between one or more feature points of the one or more images of the 3D point cloud data; generating one or more rigid body transforms corresponding to the one or more feature points based on the normalized cross correlations; and determining the cost surface for the one or more rigid body transformation based on elements of the one or more rigid body transformations.

Other features and aspects of the disclosed technology will become apparent from the following detailed description, taken in conjunction with the accompanying drawings, which illustrate, by way of example, the features in accordance with embodiments of the disclosed technology. The summary may be not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide vehicle localization for autonomous and semi-autonomous vehicles in which sets of low-level features are registered without data association to build a discrete representation of feature sets. Feature rasters can be generated using vehicle sensor data and the cost surface computed over transformations of the feature rasters. The low-level features in relate to non-zero elements for 3D points, lines, planes, etc. Also, the discrete representation of feature sets provided by the system can be in the form of a birds-eye view, binary rasters, binary grids etc.

Embodiments may also provide a 'consistency metric/cost' correlation and a cost surface computation over a set of transformations or over all possible transformations. In applications where low-level feature rasters are sparse (few nonzero elements), the system may be implemented to reduce complexity of computing a cost by only performing operations over the nonzero elements. This is because many cost scores are arrived at using convolutions.

In some embodiments, the system detects features and lines using vehicle sensors and builds a feature raster, which may include a point, line or polygon converted to a raster data set. The system may also receive a feature map, which may, for example, be a previously generated and stored feature map such as a point cloud data set of the area surrounding the coarse position of the vehicle. The feature map may be in the form of a set of features projected down to a birds eye view, and may be used to generate a raster for the map data. The system then runs a registration algorithm to match and align the feature rasters across all transformations of the feature raster. The system determines the cost function for each transformation to determine which transformation has the lowest cost function. The transformation with the lowest cost function is used for vehicle localization.

The systems and methods disclosed herein may be implemented with any of a number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

Figure 1:
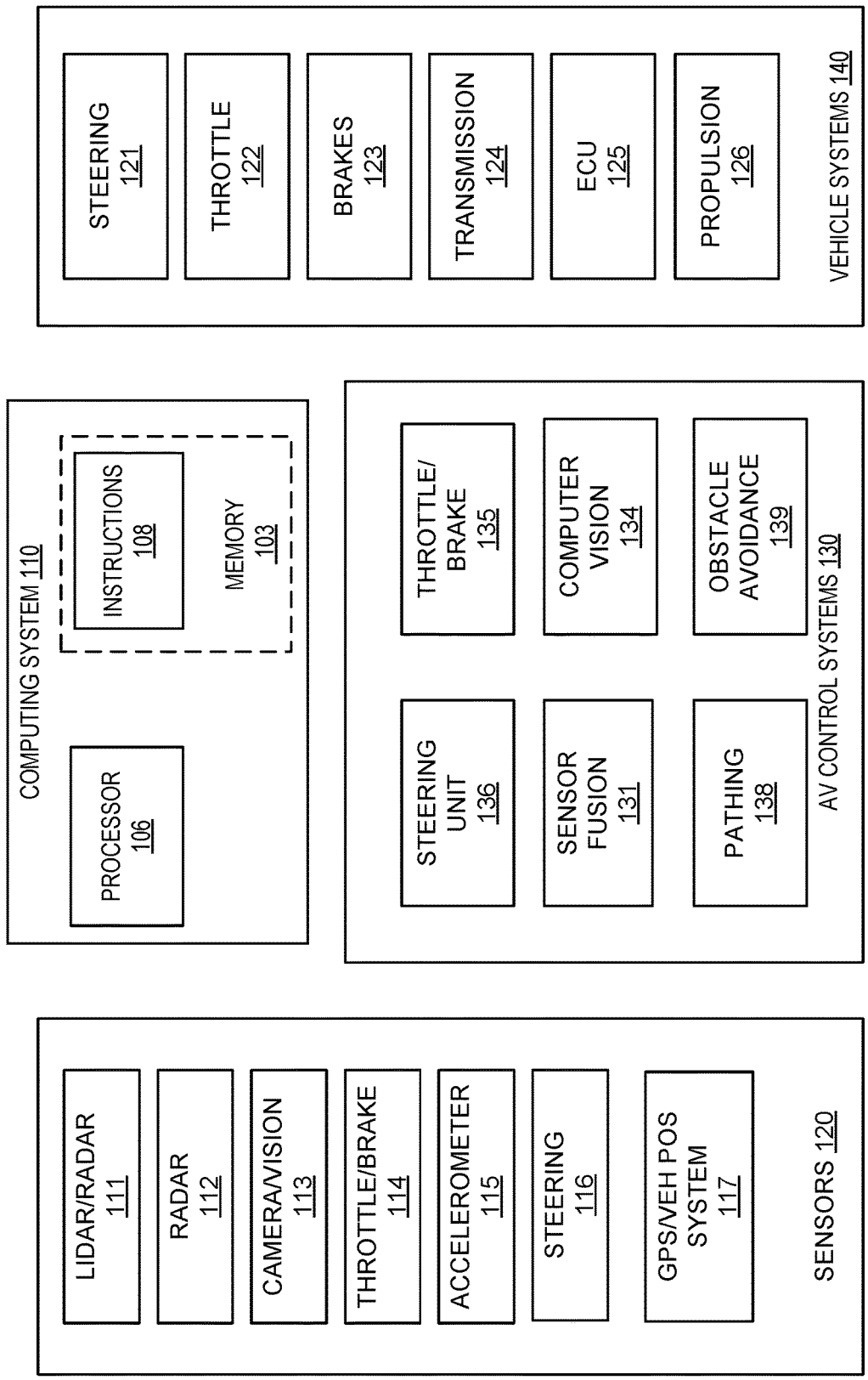
FIG. 1 illustrates an example autonomous or semi-autonomous vehicle with which embodiments of the disclosed technology may be implemented.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometer 115 may include a 3D accelerometer to measure roll, pitch and yaw of the vehicle. Accelerometer 115 may include any combination of accelerometers and gyroscopes for the vehicle or any of a number of systems or subsystems within the vehicle to sense position and orientation changes based on inertia.

Steering sensor 116 can be included to gather data regarding steering input for the vehicle by a human or autonomous operator, and vehicle positioning system 117 (e.g., GPS or other positioning system) can be used to gather position information about a current location of the vehicle as well as other positioning or navigation information. Although not illustrated, other sensors 120 may be included as well.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance system 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
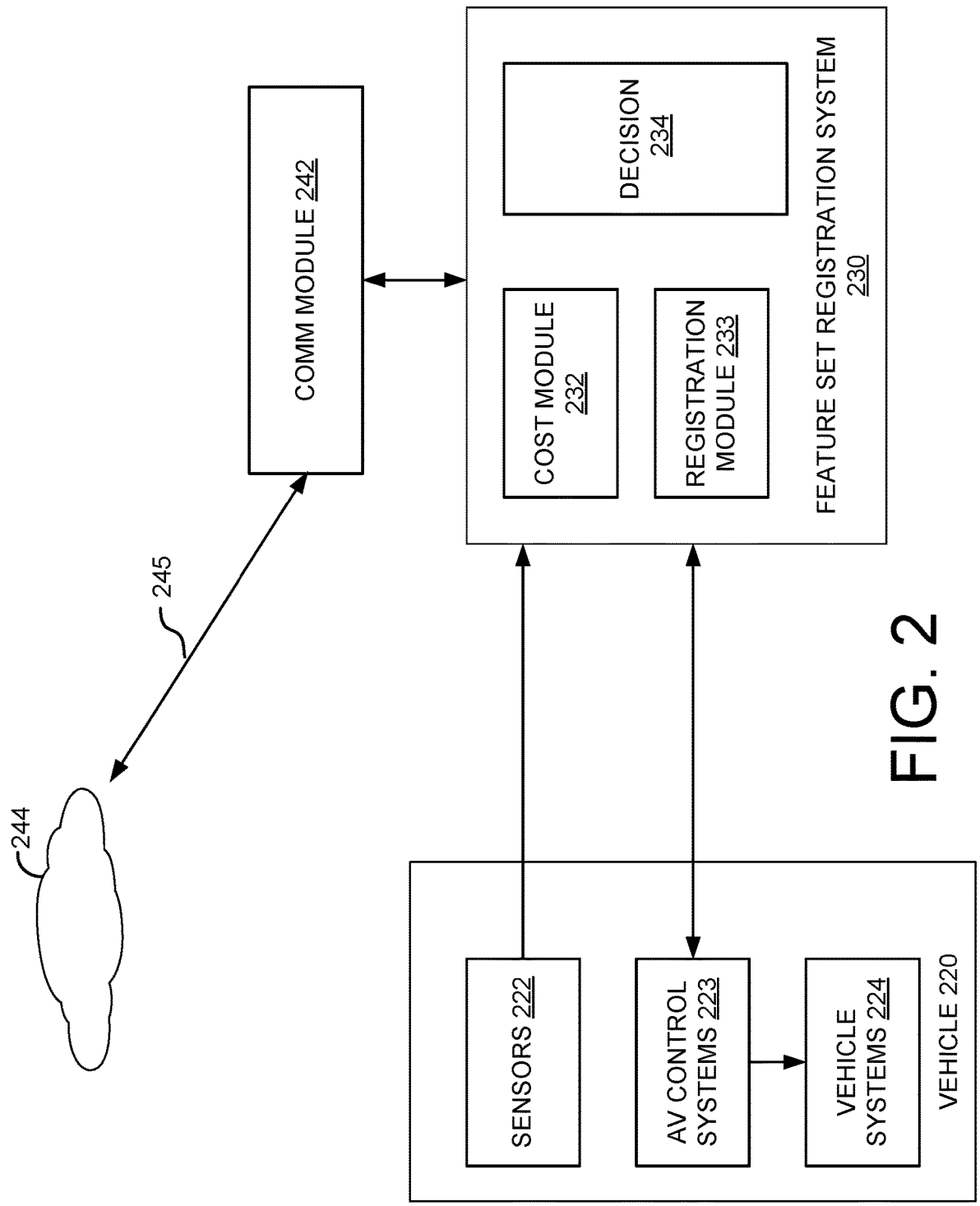
FIG. 2 illustrates an example feature set registration system in the context of an autonomous vehicle in accordance with one embodiment.

FIG. 2 illustrates an example feature set registration system in the context of an autonomous vehicle in accordance with one embodiment. In this example, vehicle 220 (e.g., vehicle 100) includes vehicle sensors 222 (e.g., sensors 120), AV control systems 223 (e.g., AV control systems 130) and vehicle systems to 224 (e.g. vehicle systems 140). A feature set registration system 230 is included to perform feature set registration. In this example, feature set registration system 230 includes a cost module 232, a registration module 233 any decision module 234. A communication module 242 is also provided to enable communications between feature set registration system 230 and external entities including a cloud server or other cloud source 244.

Feature set registration system 230 can be configured to generate feature rasters from vehicle sensor data received from vehicle sensors 222. Feature set registration system 230 can also be configured to generate map feature rasters from map data, which might include point cloud data 245 received from an external source such as a cloud source 244 via communication module 242. Cost module 232 can be used to compute a cost function over a set of transformations (e.g., all transformations) of the feature raster. The transformation with the lowest cost function may be selected by the decision module 234 for localization. In normal operations, the localization information can be provided to AV control systems 223 and used for vehicle operations. For example, AV control systems 223 can compute a vehicle operation such as steering, braking, acceleration, and so on and use this information to control vehicle systems 224 to control operation of the vehicle.

Figure 3:
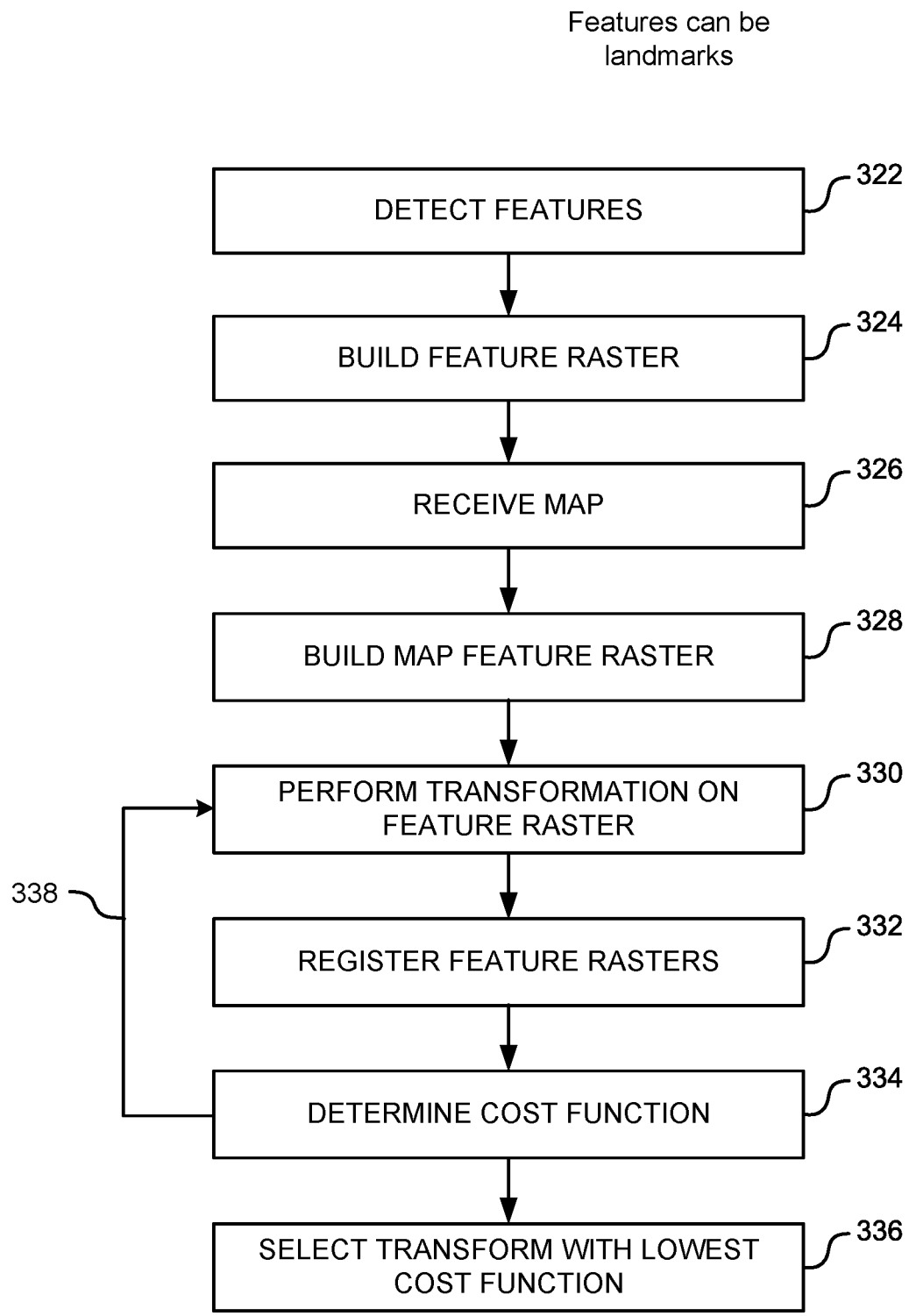
FIG. 3 illustrates an example process for feature set registration in accordance with one embodiment.

FIG. 3 illustrates an example process for feature set registration in accordance with one embodiment. In this example, feature set registration is performed using low-level features, such as 3D points, lines, planes, and so on. This can be implemented in various embodiments to reduce complexity otherwise associated with registration operations. At operation 322, the system detects features of the environment surrounding the vehicle. Features can include elements such as landmarks, traffic lights, traffic signs, telephone or light post, lane markings, road boundaries (e.g., guardrails, curbs) and so on. In some implementations, sensors such as sensors 222 can collect data that can be processed to identify the features in the environment surrounding the vehicle. For example, radar, lidar, image sensors and other sensors can be used to gather vehicle map data that is processed for feature identification. For example, a reflection data from a vehicle lidar system or stereo pairs from an imaging system can be used to generate point clouds or other image data for the surrounding environment.

At operation 324, the system projects features of the vehicle map data into a discretized feature representation. This discretized feature representation, which may be in the form of a feature raster, for example, and may be created from the point cloud data. In some implementations, the system can convert the vehicle map data to a gridded raster in a desired degree of resolution. The system can, for example, compute a raster using Z coordinate or intensity data, or other image data. The raster may include a grid of values that can be rendered as pixels. At operation 326, the system receives map data, such as map data from an external source. The map data may also include 3D point cloud data. At operation 328, the system builds a discretized feature raster for the map data, which may be implemented as a map feature raster.

With the feature raster from the sensor data and the map feature raster, the system registers the feature sets using some or all transformations of the sensor feature raster and determines the cost function for the transformations of feature rasters. The system determines the transformation that yields the lowest cost function and selects this transformation for the localization. This can be performed for one or more of the features in the feature raster. These operations are illustrated at 330, 332, 334 and 336.

At operation 330, the feature raster is transformed from the vehicle coordinate system to the map coordinate system (e.g., a global system). In the initial step, this transformation can be based on an initial guess or estimate of vehicle position. For example, the initial guess can be determined based on previous subsequent positions and can use odometry to arrive at the initial guess. The cost function is determined at operation 334 for the transformation based on the initial guess, and the process continues for subsequent transformations as illustrated by flowline 338. The output of the system is the determined vehicle state.

Figure 4:
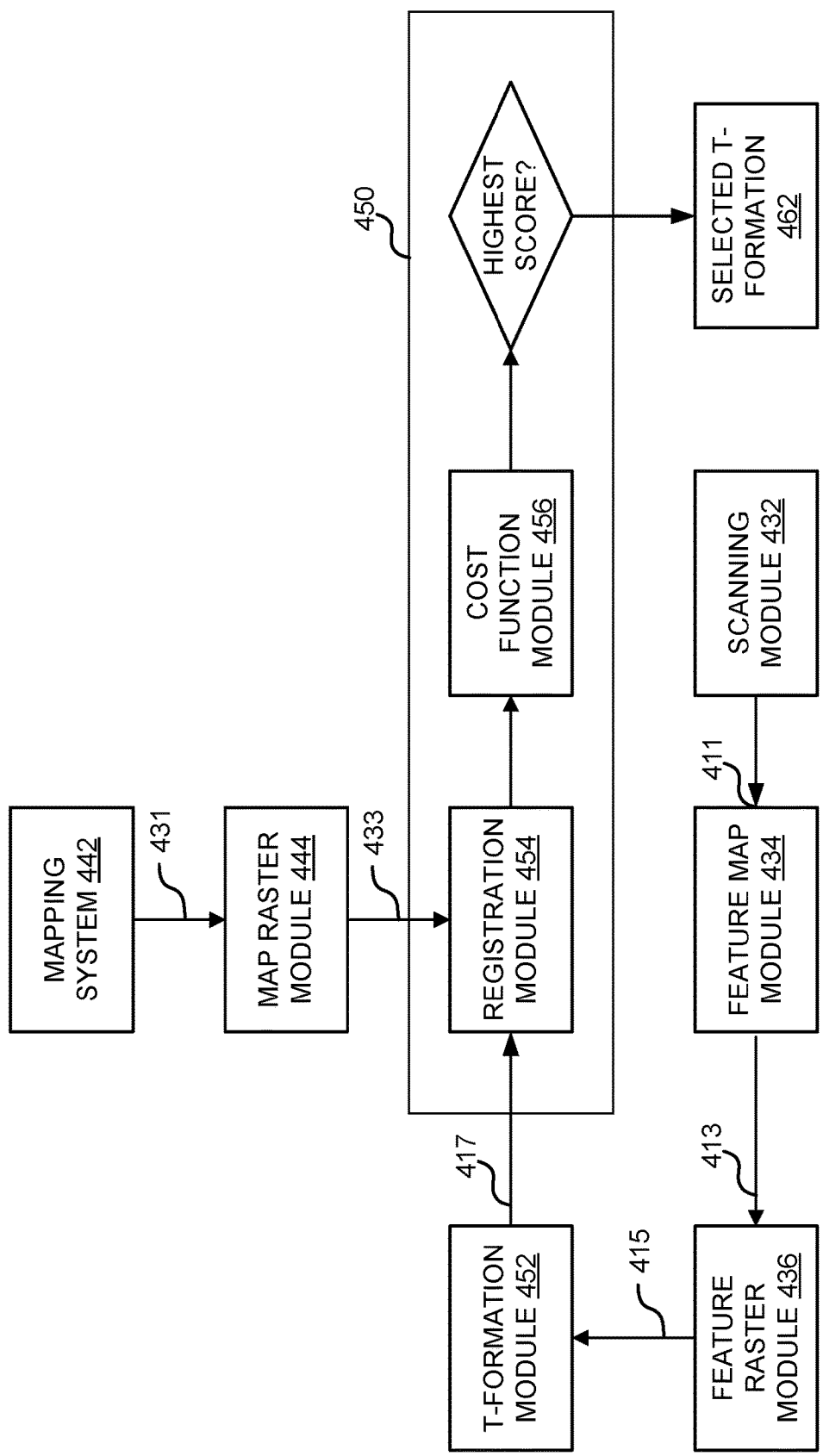
FIG. 4 illustrates an example feature set registration system in accordance with one embodiment.

FIG. 4 illustrates an example feature set registration system in accordance with one embodiment. In this illustrated example, scanning module 432 can include one or more vehicle sensors (e.g., sensors 222) to gather data regarding objects and other features surrounding the subject vehicle. As noted above, sensors 222 can include lidar sensors, radar sensors, infrared sensors, image sensors and other sensors. Sensor data 411 (e.g., sensor data sets) gathered by one or more of the sensors in scanning module 432 may be provided to a feature map generation module 434 to generate a feature map 413 using the sensor data. The data may be used to build a 2D or 3D point cloud data set of features. Fusion techniques can be used to integrate the information supplied by multiple sensors.

The feature map can be provided to feature raster module 434 to generate the feature raster 415. In some embodiments, the feature rasters can be a binary raster map that includes pixels of one state where objects are detected and pixels of another state where no objects are detected. The feature raster may be configured to only include data in grids in which a feature is detected. Accordingly, the feature rasters can be generated to contain a relatively low volume of data. This can be especially true in environments where there are a small number of features, because data is only required to represent the features themselves.

The system can also receive a 2D or 3D point cloud data set as map data 431 representing a predetermined (or real time) map of the surrounding environment from an external source. For example, other mapping systems 442 external to the vehicle can be used to generate predefined maps for navigation purposes. This map can be stored in the cloud, at other vehicles, at other places external to the subject vehicle, or within the subject vehicle itself. In some embodiments, the external map data 431 can be represented in the form of a bird's-eye view. The map can be provided to a map raster module 444 to generate a map feature raster 433 for features included in the map. As with the feature raster based 415 on sensor data, the map feature raster 433 can be a binary image data set.

The feature raster generated from sensor data can be provided to the transformation module 452. Transformation module 452 may be implemented to perform a vector or other transformation on the feature raster to convert the feature raster from the vehicle coordinate system to the map coordinate system. An initial estimation can be made based on a best guess transformation. In some embodiments, this can be arrived at using earlier determined localization information.

The initial (and subsequent) feature raster transformations 417 can be provided to a score computation module 450 that registers the initial feature raster transformation 417 of the feature raster 415 with the computed map feature raster 433 (e.g., using registration module 454) and determines a cost function associated with the registration (e.g., using cost function module 456). The system can determine whether the subject transformation has the highest score (e.g., lowest cost) to determine if it is the transformation to be used for localization. The process is completed for other feature raster transformations 417 of the feature raster to determine which has the highest score. It is the feature raster transformation 417 with the highest score that is used as the output 462 for localization.

Figure 5:
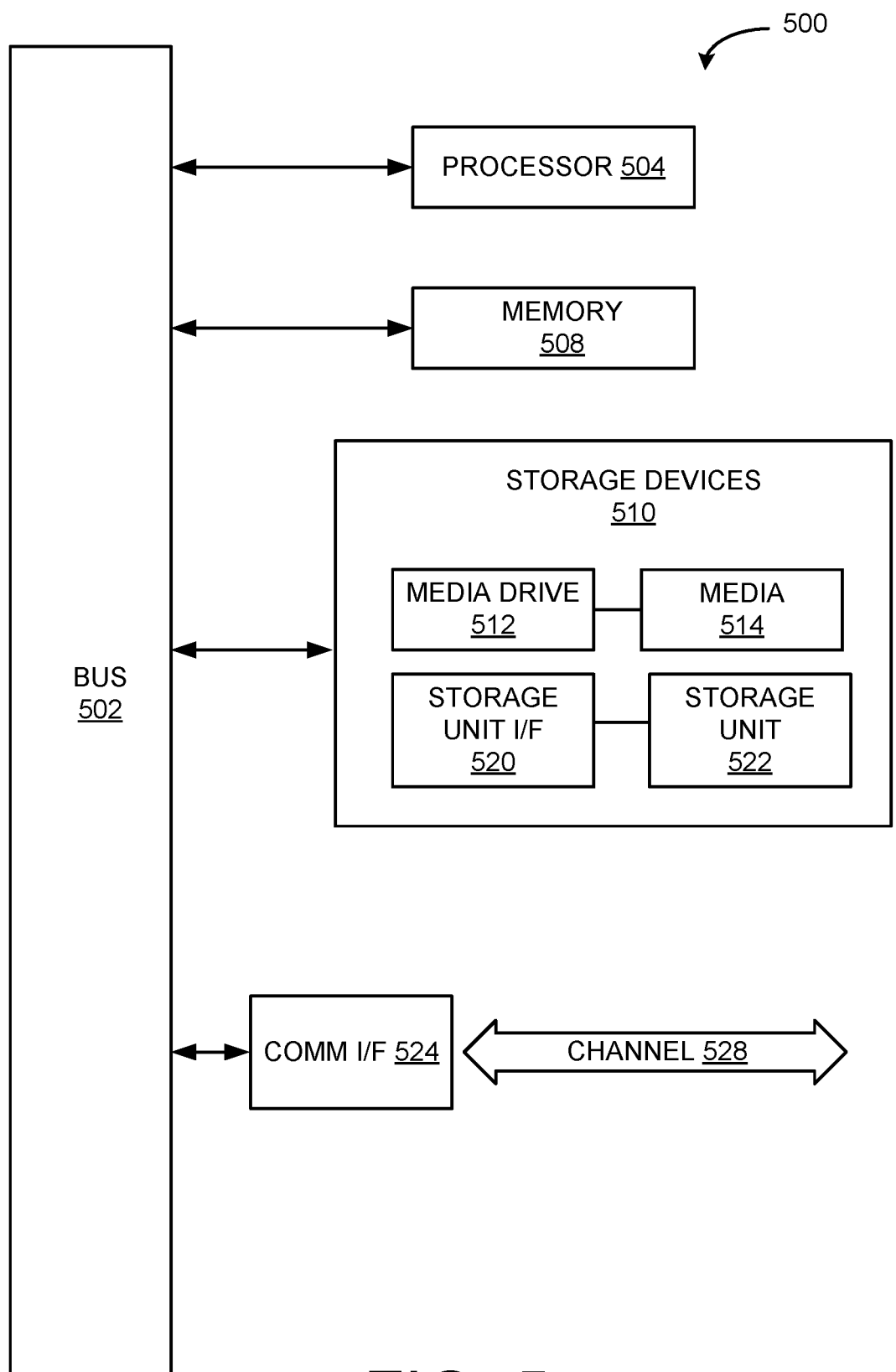
FIG. 5 is an example computing component that may be used to implement various features of embodiments described in the present disclosure.

As used herein, the term module may be used describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for localization of a subject vehicle, comprising:
   a plurality of sensors to gather data regarding features in an environment of the subject vehicle;
   a memory; and
   one or more processors that are configured to execute machine readable instructions stored in the memory for performing a method comprising:
      receiving data from the plurality of sensors;
      generating a three-dimensional feature map using the data, wherein the three-dimensional feature map comprises a plurality of features, wherein the plurality of features comprises at least one of landmarks, telephone posts, and light posts;
      extracting a feature raster image from the feature map, wherein the feature raster image comprises a binary raster map;
      registering a plurality of transformations of the feature raster image;
      generating a plurality of cost functions, wherein one cost function is associated with each transformation;
      generating a score associated with each cost function, wherein a higher score demonstrates a lower cost;
      determining the transformation with the lowest cost based on the scores and selecting the transformation with the lowest cost for localization of the subject vehicle; and
      determining localization of the subject vehicle based on the transformation with the lowest cost.

2. The system of claim 1, wherein registering a plurality of transformations comprises registering low level features without data association.

3. The system of claim 2, wherein the low level features relate to non-zero elements for at least one of 3D points, lines and planes.

4. The system of claim 1, wherein registration is performed using only nonzero elements of the feature raster.

5. A system for vehicle localization using map data from multiple sources, the system comprising:
   a non-transitory memory configured to store instructions;
   at least one processor configured to execute the instructions to:
      generate a set of vehicle map data using vehicle sensors;
      project features of the set of vehicle map data into discretized feature representation;
      transform the discretized feature representation from a vehicle frame of reference to an external map frame of reference to generate a transformed discretized three-dimensional feature representation, wherein the transformed discretized three-dimensional feature representation comprises a plurality of features, wherein the plurality of features comprises at least one of landmarks, telephone posts, and light posts;
      register the transformed discretized feature representation with a map feature representation of a set of external map data and determine a cost function associated with the registration, wherein the map feature representation comprises a binary raster map;
      repeat the registration for a plurality of transformations of the discretized feature representation and determine a plurality of cost functions, wherein one cost function is associated with each of the plurality of transformations;
      generate a score associated with each cost function, wherein a higher score demonstrates a lower cost; and
      select the transformation with the lowest cost for localization of the subject vehicle.

6. The system of claim 5, wherein projecting features of the map data into discretized feature representation comprises creating a feature raster comprising a grid of pixels identifying features in the map data and transforming the discretized feature representation comprises transforming the feature raster.

7. The system of claim 6, wherein the processor is configured to further execute an instruction to determine a discrete map feature representation of a set of external map data received from a source external to the vehicle.

8. The system of claim 7, wherein registering the transformed discretized feature representation with a map feature representation of a set of external map data comprises registering the transformed feature raster with a feature raster of the external map data.

9. The system of claim 5, wherein registering the transformed discretized feature representation with a map feature representation of a set of external map data comprises performing template matching.

10. A method for vehicle localization, comprising:
   generating a set of vehicle map data using vehicle sensors;
   projecting features of the set of vehicle map data into discretized feature representation;
   transforming the discretized feature representation from a vehicle frame of reference to an external map frame of reference to generate a transformed discretized three-dimensional feature representation, wherein the transformed discretized three-dimensional feature representation comprises a plurality of features, wherein the plurality of features comprises at least one of landmarks, telephone posts, and light posts;
   registering the transformed discretized feature representation with a map feature representation of a set of external map data and determine a cost function associated with the registration, wherein the map feature representation comprises a binary raster map;
   repeating the registration for a plurality of transformations of the discretized feature representation and determine a plurality of cost functions, wherein one cost function is associated with each of the plurality of transformations;
   generating a score associated with each cost function, wherein a higher score demonstrates a lower cost; and
   selecting the transformation with the lowest cost for localization of the subject vehicle.

11. The method of claim 10, wherein projecting features of the map data into discretized feature representation comprises creating a feature raster comprising a grid of pixels identifying features in the map data and transforming the discretized feature representation comprises transforming the feature raster.

12. The method of claim 11, further comprising determining a discrete map feature representation of a set of external map data received from a source external to the vehicle.

13. The method of claim 12, wherein registering the transformed discretized feature representation with a map feature representation of a set of external map data comprises registering the transformed feature raster with a feature raster of the external map data.

14. The method of claim 10, wherein registering the transformed discretized feature representation with a map feature representation of a set of external map data comprises performing template matching.

15. A method of localization of a subject vehicle, comprising:
receiving data regarding features in an environment of the subject vehicle;
generating a three-dimensional feature map using data gathered from one or more of the plurality of sensors, wherein the three-dimensional feature map comprises a plurality of features, wherein the plurality of features comprises at least one of landmarks, telephone posts, and light posts;
extracting a feature raster image from the feature map wherein the feature raster image comprises a binary raster map;
registering a plurality of transformations of the feature raster image, to generate a plurality of cost functions, wherein one cost function is associated with each of the plurality of transformations, to generate a score associated with each cost function, wherein a higher score demonstrates a lower cost, and to determine the transformation with the lowest cost;
selecting the transformation with the lowest cost for localization of the subject vehicle; and determining localization of the subject vehicle, based on the transformation with the lowest cost.

16. The method of claim 15, wherein registering a plurality of transformations comprises registering low level features without data association.

17. The system of claim 16, wherein the low level features relate to non-zero elements for at least one of 3D points, lines and planes.

18. The system of claim 15 wherein registration is performed using only nonzero elements of the feature raster.

19. The system of claim 1, wherein the plurality of features comprises at least one of traffic elements, lane markings, road boundaries.

* * * * *